United States Patent Office 3,579,557
Patented May 18, 1971

3,579,557
WATER AND OIL REPELLENTS
Thomas W. Brooks and Paul D. Schuman, Gainesville, and Calvin D. Padgett, Waldo, Fla., assignors to Calgon Corporation, Pittsburgh, Pa.
No Drawing. Filed Aug. 21, 1968, Ser. No. 754,457
Int. Cl. C07f 7/10
U.S. Cl. 260—448.2N    3 Claims

ABSTRACT OF THE DISCLOSURE

Certain fluorosilazanes and chlorosilanes are disclosed. The new compounds are of the formulas $$R_f(CH_2CH_2)_xSiCl \quad \text{and} \quad [R_f(CH_2CH_2)_xSi\underset{R_2}{\overset{R_1}{|}}]_2NH$$

in which $x$ is 0–10 and $R_1$ and $R_2$ are independently selected alkyl groups. They are useful as oil and water repellents and as derivatizing agents to facilitate gas-liquid chromatographic analyses.

---

Reference is made to U.S. Pat. 3,322,490, which contains an excellent review of the prior art in the field of water, oil, and soil repelling and shedding compositions, to which this invention pertains.

BACKGROUND OF THE INVENTION

The field of oil and water repellents has grown considerably in the past few years, as demand has been created for materials, particularly textile materials, which resist not only water but stains and dirt of all kinds. It is difficult to make such materials which exhibit both water and oil repellency, and at the same time are substantive to the textile or other surface to which they are added.

SUMMARY OF THE INVENTION

We have invented a series of compounds which exhibit, when applied to a suitable substrate, the desired properties of oil and water repellency. They are compounds of the formula $$\text{I} \quad R_f(CH_2CH_2)_xSiCl \underset{R_2}{\overset{R_1}{|}} \quad \text{and} \quad \text{II} \quad [R_f(CH_2CH_2)_xSi\underset{R_2}{\overset{R_1}{|}}]_2$$

wherein $R_f$ is a radical of the formula $C_nF_{(2n+1)}$, $C_nF_{(2n+1)}CH_2$, $(CF_3)_2CFO$, $(CF_3)_2CF(CF_2)_yCH_2O$ $(CF_3)CHO$, or $C_nF_{(2n+1)}O$, $R_1$ and $R_2$ are radicals selected from the group consisting of aryl and lower alkyl groups having up to four carbon atoms, $n$ is a whole number from 1 to 18, $x$ is a whole number from 1 to 10, and $y$ is a whole number from 2 to 18.

Our new compounds are also useful as derivatizing agents in preparing samples for analysis by gas-liquid chromatography. The chloride form particularly will readily react with alcohols, amines and organic acids, thereby rendering them responsive to analytical techniques utilizing "electron capture," and imparting characteristics of volatility which the sample may not otherwise have. They may also be used to convert —SiOH groups on the surfaces of diatomaceous earth supports in gas chromatographs to groups which are inert to the compound to be analyzed, thus eliminating "tailing" commonly noticed in the analysis of many compounds.

Our preferred compounds are $$\left( CF_3-\underset{CF_3}{\overset{F}{\underset{|}{C}}}-O-CH_2-CH_2-CH_2-\underset{CH_3}{\overset{CH_3}{\underset{|}{Si}}}- \right)_2 NH$$

and $$\left( CF_3CF_2CF_2CH_2-O-CH_2CH_2CH_2-\underset{CH_3}{\overset{CH_3}{\underset{|}{Si}}}- \right)_2 NH$$

The synthesis of such compounds may be illustrated by the following sequence of reactions:

$$C_7F_{15}CH_2ONa + BrCH_2CH=CH_2 \longrightarrow$$
$$C_7F_{15}CH_2OCH_2CH=CH_2 + NaBr$$

$$C_7F_{15}CH_2OCH_2CH=CH_2 + H\underset{R_2}{\overset{R_1}{\underset{|}{Si}}}Cl \longrightarrow$$
$$C_7F_{15}CH_2OCH_2CH_2CH_2\underset{R_2}{\overset{R_1}{\underset{|}{Si}}}Cl \quad (I)$$

$$C_7F_{15}CH_2OCH_2CH_2CH_2\underset{R_2}{\overset{R_1}{\underset{|}{Si}}}Cl + NH_3 \longrightarrow$$

$$\left[ C_7F_{15}CH_2OCH_2CH_2CH_2\underset{R_2}{\overset{R_1}{\underset{|}{Si}}}- \right]_2 NH \quad (II)$$

The following examples may serve further to illustrate the procedure for making our new compounds:

EXAMPLE I

Synthesis of $(CF_3)_2CFO(CH_2)_3Si(CH_3)_2Cl$

To a 5-liter, 3-neck flask fitted with a Dry-Ice cooled condenser, a mechanical stirrer, a dropping funnel, and a gas inlet tube was added 287 g. (4.95 moles) of anhydrous KF and 1900 ml. of dry dimethyl formamide (DMF). The reaction mixture was cooled to $-20°$ and while stirring hexafluoroacetone was added at a rate such that a continuous reflux occurred. After addition of 840 g. (5.06 moles) of hexafluoroacetone the reaction mixture was warmed to room temperature. The low temperature reflux condenser was replaced by a water cooled Friedricks condenser which was connected to a trap maintained at $-183°$. While stirring the reaction mixture at room temperature, 560 g. (4.63 moles) of allyl bromide was added. The mixture was heated at 80° for 16 hours, then rectified on a 15 theoretical plate. Oldershaw distillation column, giving 771 g. (74% yield) of $$(CF_3)_2CFOCH_2CH=CH_2$$

B.P. 62–64°.

To an evacuated 2000-ml. capacity steel cylinder equipped with pressure gage and containing 2.3 g. of Pt on carbon and 2.0 g. of $H_2PtCl_6.6H_2O$ was added 686 g. (2.95 moles) of $(CF_3)_2CFOCH_2CH=CH_2$ and 331 g. (3.52 moles) of $(CH_3)_2SiHCl$. Shortly after addition of the reactants an exotherm occurred and the cylinder pressure rose to 120 p.s.i.g. When allowed to cool to room temperature, the pressure remained at 40 p.s.i.g. The volatiles were vented and the remaining liquid distilled giving 524 g. (56% yield) of $$(CF_3)_2CFO(CH_2)_3Si(CH_3)_2Cl$$

B.P. 80–87° (43–46 mm.). Chromatographic analysis indicated 95+percent purity.

EXAMPLE II

Synthesis of [(CF₃)₂CFO(CH₂)₃Si(CH₃)₂]₂NH

To a liter, 3-neck flask equipped with a thermowell, a stirrer, a gas inlet tube, and a gas outlet tube connected to a bubble counter was added 330 g. of hexane and 249 g. (0.778 mole) of (CF₃)₂CFO(CH₂)₃Si(CH₃)Cl. Ammonia gas was added to the reaction mixture at rate adjusted to not exceed the reaction rate. This rate was monitored by observing the exit bubble counter. When no further reaction occurred, the reaction was terminated. The temperature of the reaction mixture rose from ambient to 40–50° during the course of the reaction. The mixture was filtered and the filtrate distilled on 160 cm. column packed with glass helices giving 163 g. (72% yield) of [(CF₃)₂CFO(CH₂)₃Si(CH₃)₂]₂NH; B.P. 165–168° (44 mm.).

EXAMPLE III

Synthesis of C₇F₁₅CH₂O(CH₂)₃Si(CH₃)₂Cl

To a 1-liter, 3-neck flask fitted with a Vigreux distillation column vented to a trap cooled to −183°, a thermometer, and an addition funnel was added 300 ml. of dioxane and 56.0 g. (1.04 moles) of CH₃ONa. The reaction mixture was heated to about 90° and 200 g. (0.5 mole) of C₇F₁₅CH₂OH was slowly added while continuously removing CH₃OH as distillate. After addition of the octanol, distillate was removed up to a distillate temperature of 100°.

While at total reflux a solution of 121 g. (1.06 moles) of CH₂=CHCHCl in 150 ml. of dioxane was added dropwise. After complete addition, the reaction mixture was cooled and a clear layer was removed by decantation. The residual salt was dissolved in H₂O and the organic layer which separated was combined with the decanted product. Distillation gave 137 g. (62% yield) of

C₇F₁₅CH₂OCH₂CH=CH₂

B.P. 175–177°. Chromatographic analysis showed no impurities.

To a 250-ml., 3-neck flask fitted with a thermometer, a −78° condenser vented to a −183° trap, a stirrer and an addition funnel was added 56.0 g. (0.127 mole) of C₇F₁₅CH₂OCH₂CH=CH₂, 0.5 g. of 5% Pt on carbon and 0.5 g. of H₂PtCl₆·6H₂O. With the reaction mixture at room temperature, 20.8 g. (0.22 mole) of (CH₃)₂SiHCl was added at a rate sufficient to maintain the temperature of reaction mixture at 40 to 50°. On distillation of the resultant reaction mixture, 45.7 g. (70% yield) of C₇F₁₅CH₂O(CH₂)₃Si(CH₃)₂Cl B.P. 127–128°/12 mm., was obtained.

EXAMPLE IV

Synthesis of [C₇F₁₅CH₂O(CH₂)₃Si(CH₃)₂]NH

This synthesis is similar to that described in Example II, using the chloride product obtained in Example III. An 81% yield of [C₇F₁₅CH₂O(CH₂)₃Si(CH₃)₃]NH, B.P. 175–177°/1.5 mm., was obtained.

EXAMPLE V

Synthesis of C₃F₇(CH₂)₂Si(CH₃)₂Cl

To an evacuated 900-ml. capacity steel cylinder was added 98 g. (0.50 mole) of C₃F₇CH=CH₂, 67.8 g. (0.72 mole) of (CH₃)₂SiHCl, 1.0 g. 5% Pt on carbon and 1.7 g. of H₂PtCl₆·6H₂O. After heating the reaction for 22 hours at 75° the liquid product was transferred to a glass flask and distilled to give 93.6 g. (64% yield) of C₃F₇(CH₂)₂Si(CH₃)₂Cl, B.P. 63–67°/41 mm.

EXAMPLE VI

Synthesis of [C₃F₇(CH₂)₂Si(CH₃)₂]₂NH

This synthesis is similar to that described in Example II, utilizing the chloride of Example V. A 93% yield of [C₃F₇(CH₂)₂Si(CH₃)₂]₂NH, B.P. 123–125°/41 mm., was obtained.

We do not intend to be restricted to the above specific illustrations and examples. Our invention may otherwise be practiced within the scope of the following claims:

We claim:

1. Compound of the formula $$\left[ R_f(CH_2CH_2)_x Si \begin{matrix} R_1 \\ | \\ R_2 \end{matrix} \right]_2 NH$$

wherein $R_f$ is a monovalent radical selected from the group consisting of $CnF_{(2n+1)}$, $CnF_{(2n+1)}CH_2O$, $(CF_3)_2CFO$, $(CF_3)CHO$, $(CF_3)_2CF(CF_2)_yCH_2O$ and $CnF_{(2n+1)}O$, $R_1$ and $R_2$ are selected from aryl groups and alkyl groups of up to four carbon atoms, $n$ is a whole number from 1 to 18, $x$ is a whole number from 1 to 10, $y$ is a whole number from 2 to 18.

2. Compound of the formula

[(CF₃)₂CFOCH₂CH₂CH₂Si(CH₃)₂]₂NH

3. Compound of the formula $$\left( CF_3CF_2CF_2CH_2-O-CH_2CH_2CH_2-Si\begin{matrix}CH_3\\|\\CH_3\end{matrix} \right)_2 NH$$

References Cited

UNITED STATES PATENTS 3,453,233    7/1969    Flatt      260—448.2X
3,485,857    12/1969    Speier      260—448.2X TOBIAS E. LEVOW, Primary Examiner P. F. SHAVER, Assistant Examiner U.S. Cl. X.R.

260—448.2B, 448.2R; 106—13R

UNITED STATES PATENT OFFICE
CERTIFICATE OF CORRECTION

Patent No. 3,579,557　　　　　　　　Dated May 18, 1971

Inventor(s) Thomas W. Brooks et al.

It is certified that error appears in the above-identified patent and that said Letters Patent are hereby corrected as shown below:

Column 1, formula I, portion of the formula reading $_x$SiCl　　　　　should read　　　$_x$-Si-Cl formula II, portion of the formula reading Si⊣　　　　　should read　　　Si⊣—NH Column 3, line 4, before "liter" insert -- 1- --; line 47, after "of" insert -- the --.

Signed and sealed this 23rd day of May 1972.

(SEAL)
Attest:

EDWARD M. FLETCHER, JR.　　　　　ROBERT GOTTSCHALK
Attesting Officer　　　　　　　　　Commissioner of Patents